United States Patent [19]
Gunther

[11] 3,863,498
[45] Feb. 4, 1975

[54] ENGINE TIMING METER
[75] Inventor: Bernd Gunther, Framingham, Mass.
[73] Assignee: Thermo Electron Corporation, Waltham, Mass.
[22] Filed: July 28, 1972
[21] Appl. No.: 276,232

[52] U.S. Cl. .................................. 73/118, 324/16 T
[51] Int. Cl. ......................................... G01m 15/00
[58] Field of Search ............. 73/118, 116; 324/16 T

[56] References Cited
UNITED STATES PATENTS
2,863,114   12/1958   Murphy............................ 324/16 T
3,650,149   3/1972   Howes .............................. 73/117.3

*Primary Examiner*—Jerry W. Myracle
*Attorney, Agent, or Firm*—James L. Neal

[57] ABSTRACT

Method and apparatus are disclosed for measuring ignition timing of an internal combustion engine using alternately reference signals from the crankshaft pulley and ignition signals from one or more cylinders. A preferred embodiment uses ignition signals from two cylinders that fire 360° apart. The reference and ignition signals shift an electric wave train between respective predetermined voltage states, and the DC level between said states is used as a measure of timing.

11 Claims, 5 Drawing Figures

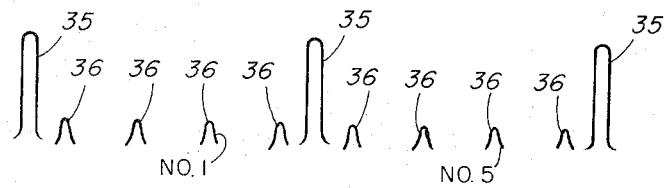
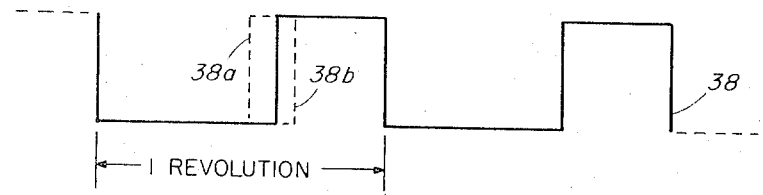
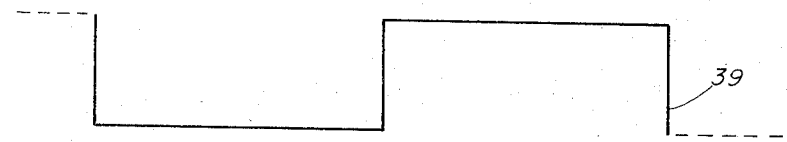
FIG. 2
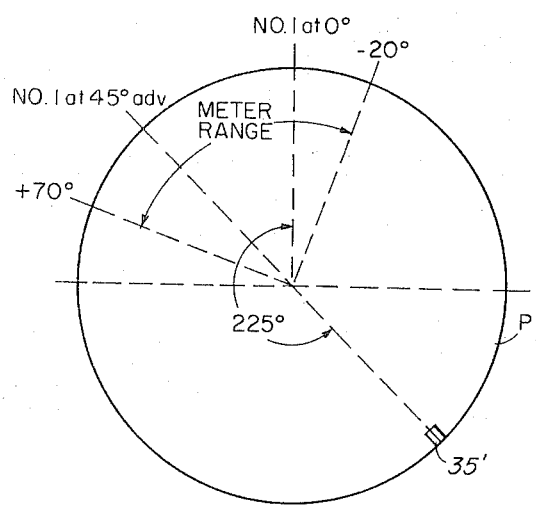
FIG. 5
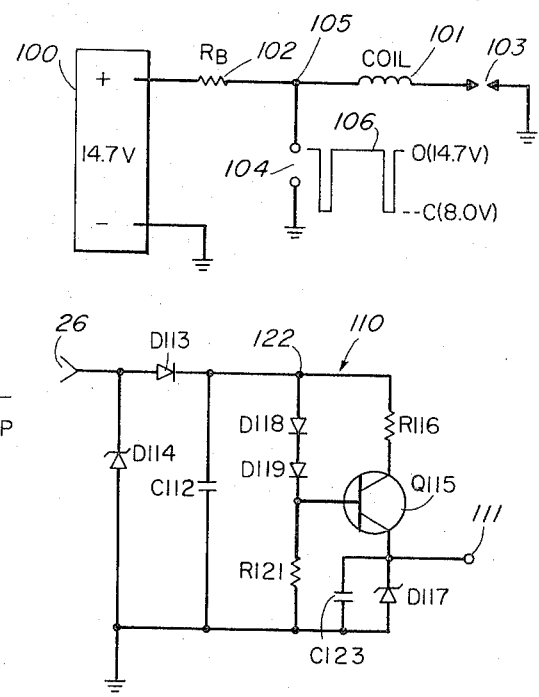
FIG. 3
FIG. 4

ENGINE TIMING METER

BRIEF DESCRIPTION OF THE INVENTION

A timing meter for an internal combustion engine displays engine timing by use of crankshaft pulley pulses and ignition pulses from one or preferably two cylinders that fire 360° apart. The latter approach yields more accurate timing measurement especially when the angular velocity of the pulley varies over a single revolution, as when all cylinders are not producing equal power. The pulley pulses together with the ignition pulses are used to determine piston position at the moment of spark plug firing; i.e: engine timing. One method to display engine timing is to use the pulley pulses and ignition pulses from two cylinders that fire 360° apart to generate a square wave. This may be done in an RS flip-flop that is triggered at one input by signals derived from pulley pulses, and at a second input by signals derived from first one and then the other of the ignition pulses from the two cylinders. The output as illustrated herein is a square wave, and if (for example) the engine is an 8-cylinder engine with four evenly-spaced cylinders firing per crankshaft revolution, and the pulley pulse coincides with TDC (TDC = top dead center; piston at highest position in cylinder; piston velocity = 0; connecting rod centered in cylinder) of a cylinder and ignition pulses are taken from two cylinders which fire 180° from the pulley pulse, the DC level of this square wave will be a direct measure of timing, being zero at zero degrees advance and varying linearly in amplitude and polarity with timing.

To get the two ignition pulses separate pick-ups may be used on the distributor-to-spark-plug cables of the two cylinders. Instead of using two pickups, a single pickup at the coil, in conjunction with a gating circuit, can also be used. The gating circuit turns on the input line for the spark-or ignition-derived signal in that fraction of the cycle where the desired cylinders are firing. Ignition-derived signals from the other cylinders do not trigger the instrument. The gating circuit is an RS flip-flop triggered by each pulley pulse and by a gating pulse generated by the circuit. The DC average of the square wave of this flip-flop is an indication of the position of the gating pulse. This signal is compared with a reference voltage and the result is amplified and used to generate a ramp. The ramp is compared with another reference voltage, and used to trigger the gating input of the flip-flop.

BRIEF DESCRIPTION OF THE DRAWINGS

FIG. 2 is a set of graphs useful to explain the operation of the system shown in FIG. 1;

FIG. 3 schematically illustrates a circuit for deriving spark signals from the ballast resistor in the distributor circuit;

FIG. 4 is a schematic circuit of the power supply shown in FIG. 1; and

FIG. 5 schematically illustrates engine timing concepts.

DETAILED DESCRIPTION OF THE DRAWINGS

Figure 1:
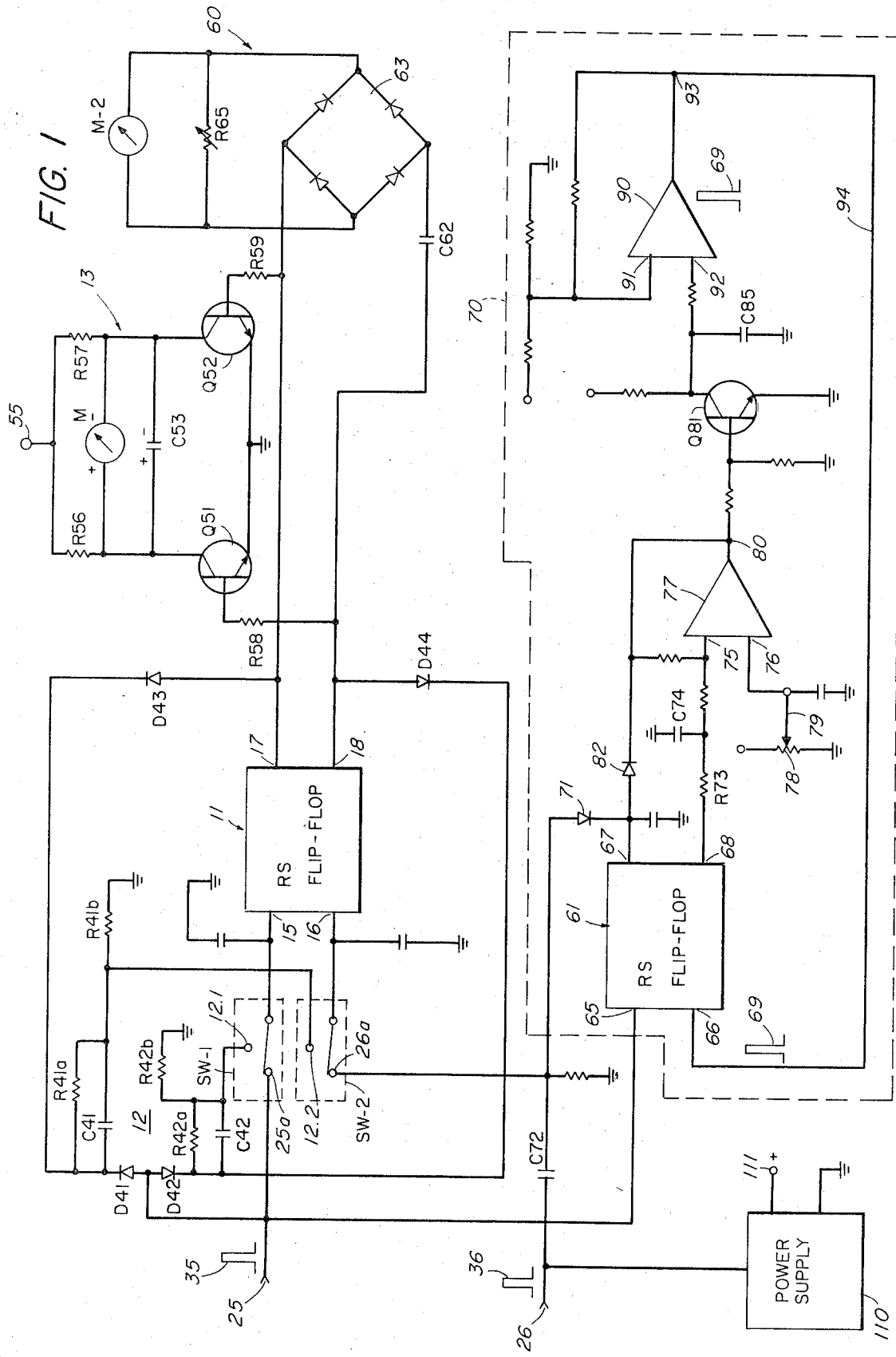
FIG. 1 schematically illustrates an engine-timing meter system according to the invention.

The basic operation functions of the invention will be described first, with reference to FIGS. 1 and 2 which illustrate a form of pulley signal processing. A detailed description of the drawings, and of some auxiliary features and variations of the invention will follow. The invention is illustrated with positive-pulse signals, by way only of example.

GENERAL OPERATION OF FIG. 1

Basic components of the timing system shown in FIG. 1 are a primary set-reset flip-flop 11, calibrating section 12 and meter section 13. The flip-flop 11 is a static flip-flop with set-reset capability. It has set and reset input terminals 15 and 16, respectively, and two output terminals 17 and 18, respectively. Such a flip-flop may be realized with two NOR gates connected as shown in FIG. 25 on page 20 of "RCA COS/MOS Integrated Circuit Manual", Technical Series CMS-270, 1971. It may also be realized with two NOR gates in a transistor, transistor logic integrated circuit package available commercially under the designation TTL 7402 from various suppliers in the United States of America, as well as in other known forms. The flip-flop 11 has the logic property that a set pulse changing the logic state of the set terminal 15 will cause the logic state of the output terminals 17 and 18 to reverse (flip over), and thereafter only a reset pulse inserted at the reset input terminal 16 will reverse (flop) the logic state of the output terminals back again. Thus, each of the output terminals 17 and 18 is at all times at one or the other of two specified voltage levels (HI and LO), one being "HI" while the other is "LO" and vice versa.

Input signals are brought to the flip-flop 11 over system input terminals 25 and 26 which are coupled, respectively, to the flip-flop input terminals 15 and 16. Input signal pulses 35 (FIG. 2) for the first system terminal 25 are derived from the pulley P of the engine (FIG. 2) in synchronization with the pulley mark 35' in any known fashion, while input pulses for the second system input terminal 26 are selected from among the ignition pulses 36 of individual cylinders, in a manner described below. The pulley-derived pulses 35 are reference pulses, and accordingly the first input terminal 25 is the system reference signal terminal. The second terminal 26 may then, conveniently, be termed the test signal terminal.

Pulley-derived pulses 35 and selected ignition-derived pulses 36 are used alternately to set and reset the flip-flop 11, as is exemplified by the HI-LO graph 38 in FIG. 2. This graph illustrates the logic state of one or the other of output terminals 17 and 18 over two revolutions of an 8-cylinder engine under test, using two cylinders (e.g: the first and fifth cylinders in the firing order) as the test cylinders. The DC average of the logic states of the flip-flop output terminals 17 and 18, as appearing in the metering section capacitor C53, is used as an indicator of timing conditions in the engine. If the timing of the spark of a cylinder is advanced or retarded, as is illustrated by dotted lines 38a and 38b, respectively, at cylinder No. 1 on graph 38, this DC average will change in both magnitude and direction. A unique and very simple tachometer 60 is coupled across the output terminals 17 and 18, taking advantage of the fact that the ac frequency of the graph 38 is proportional to engine-revolutions speed.

CALIBRATION OF FIG. 1

The reference signal terminal 25 is coupled to the flip-flop 11 over a first single-pole double-throw switch SW-1. The test signal terminal 26 is coupled to the flip-flop 11 over a second single-pole double-throw switch SW-2. The reference signal terminal is additionally coupled in parallel to the calibrating section 12 and to an input of an auxiliary RS flip-flop 61 (used in a gating circuit sub-assembly 70, for a preferred mode of practising the invention, as will be described). When the switches are closed on their signal input contacts 25a and 26a, the system input signals are applied to the primary flip-flop 11. When the switches are closed on their calibration contacts 12.1 and 12.2, respectively, the signal input terminals 25 and 26 are disconnected from the primary flip-flop 11, the reference signal input terminal 25 remains coupled only to the calibrating section 12 (and to the auxiliary flip-flop 61 which, however, is not used in calibrating the system), the test signal input terminal 26 is disconnected entirely from the primary flip-flop 11, and the input terminals 15 and 16 of the primary flip-flop are connected to respective outputs of the calibrating section 12 via the calibration contacts.

The reference pulse input terminal 25 receives one reference pulse 35 per engine revolution (FIG. 2). The reference pulses are applied to the junction of the anodes of first and second diodes D41 and D42 in the calibrating section. The cathode of each of these diodes is connected to ground through two resistors in series, R41a and R41b for diode D41, and R42a and R42b for diode D42. The first-named resistor in each pair is shunted with a capacitor C41 or C42, respectively. A third reversely-poled diode D43 is connected between first diode D41 cathode and one flip-flop output terminal 17, while a fourth reversely-poled diode D44 is connected between second diode D42 cathode and the other flip-flop output terminal 18.

Depending on the logic states of the output terminals 17 and 18, one or the other of the first and second diodes D41 and D42, but not both simultaneously, will be conductive to a reference pulse 35. For example, if the first output terminal 17 is "HI", the third diode D43 will conduct and will back-bias the first diode D41 so that it cannot conduct the reference pulse 35 (i.e: will be open-circuited); at the same time the second output terminal 18 is LO, so that the fourth diode D44 is open-circuited, and the reference pulse can be conducted by the second diode D42, and is coupled through capacitor C42. A positive-going voltage pulse appears at the calibration contact 12.1 of switch SW-1 and is applied to the first input 15 of the flip-flop 11, where it is effective to flip over the logic state of the output terminals 17 and 18. A next-succeeding reference pulse 35 is then fed via the first diode D41 (now conductive because the first output terminal 17 is LO) and the calibration contact 12.2 of the second switch SW-2 to the second input 16 of the flip-flop 11 where it is effective to flop the logic state over again. This occurs once each revolution of the engine as is illustrated by graph 39 in FIG. 2.

The meter section 13 comprises first and second similar transistors Q51 and Q52 having their collector-emitter paths connected in shunt between a positive-voltage supply terminal 55 and ground at 54. A first load resistor R56 is connected between the supply terminal and Q51 collector. A second load resistor R57 is connected between the supply terminal and Q52 collector. A third resistor R58 is connected between Q51 base and the second output terminal 18 of the primary flip-flop 11. A fourth resistor R59 is connected between Q52 base and the first output terminal 17 of the primary flip-flop 11. The meter capacitor C53 is connected between the collectors of the two transistors. The timing meter M is connected in shunt with the meter capacitor. The resistors R56, R57, R58 and R59 are proportioned so that when the system is set for calibrating the meter M, with reference pulses being applied to the reference pulse input terminal 25, a voltage wave as represented by graph 39 in FIG. 2 will produce a meter deflection to 45° on the timing scale of the meter, if the pulley mark of the engine under test is set 225° ahead of zero-degree-advance firing of the test cylinder, as is illustrated in FIG. 2 and FIG. 5, which are drawn with reference to a typical 8-cylinder V-type engine.

Referring to FIG. 5, it will be seen that when cylinder No. 1 is advanced 45° the pulley mark 35' is 180° away. When calibrating the system, the same duty cycle is obtained but at half the frequency used during a timing measurement that uses two cylinders which are 360° apart (compare graphs 38 and 39 in FIG. 2). For a normally operating engine and instrument, the reading will be 45°. If the engine is unduly rough the meter reading may differ from 45°, because the pulses of graph 39 will then not be of equal width. Thus, this calibration system checks both the instrument and the engine at the same time. If a 45° reading is not obtained on calibration, the system can be checked on another engine, or against a calibration standard, before concluding that the instrument is defective.

There is thus an advantage in using the engine under test as a signal generator for calibrating the instrument. One verifies the accuracy of the engine-timing meter system. An internal signal generator can be built into the timing system, and would be useful to test the instrument for calibration accuracy but this would not reveal the fact that the engine to be tested for timing might be in such poor condition that this method of timing might not be reliable. It is intended that timing systems including an internal calibration standard in an instrument are within the scope of the invention.

The resistors in the meter circuit may have values as follows:
R56 = 2200 ohms
R57 = 3300 ohms
R58 = 2200 ohms
R59 = 2200 ohms
Capacitor C53 may be 400 µfd, at 6 volts.

THE AUXILIARY TACHOMETER IN FIG. 1

The tachometer 60 takes advantage of the fact that the output wave 38 from the primary flip-flop 11 over its output terminals 17 and 18 is a wave of constant amplitude. A capacitor C62 is in series between a diode bridge full-wave rectifier 63 and the output terminals. Output of the rectifier is applied across a meter M-2 calibrated to show engine RPM. The shunt variable resistor R65 is used to trim the meter scale with respect to the capacitor C62. At zero speed the meter automatically goes to zero. This tachometer circuit uses the raw pulses from the capacitor C62 without squaring. The pulse frequency is proportional to engine speed. If desired, one may incorporate switching means to use one and the same meter device M in both the timing meter circuit and the tachometer circuit. Such an arrangement is not illustrated in order to avoid a more complicated drawing.

OPTIONAL EMBODIMENTS OF THE INVENTION

It will now be appreciated that the invention provides a timing meter for an internal combustion engine that displays engine timing by use of crankshaft pulley-derived pulses and ignition-derived pulses from one or more cylinders. In a one-cylinder embodiment, a connection is made from the test cylinder to the test signal terminal 26, and the gating circuit subassembly 70 is omitted. The wave from the test cylinder has the same frequency as the calibration wave 39 in FIG. 2, namely, one full cycle per two engine revolutions, and this mode of practising the invention will be prone to slower meter response, and response to engine roughness. A more satisfactory mode of practising the invention is to take test signals from ignition pulses of two cylinders that fire 360° apart, such as the first and fifth cylinders in the firing order, as is illustrated in FIG. 2, at graph 38. To get the required two ignition signal pulses, two separate pick-ups may be used, for example from the respective cylinder spark plug cables. With this arrangement of separate couplings to each cylinder, the gating circuit subassembly is not needed. The advantage of this mode of using the invention is that more accurate measurement of timing is obtainable, especially when the angular velocity of the crankshaft pulley P varies over a single revolution, as where all cylinders are not producing equal power. Operating the invention with a combination of pulley-derived pulse signals and ignition-derived pulse signals from two cylinders that fire 360° apart is therefore a preferred mode of operating the invention.

The practice of using a separate pickup for each of two cylinders under observation increases the number of conductors required to couple the instrument to an engine. As many as five connections may be needed, two for ignition pulse signals, one for a pulley pulse signal, one for positive-voltage supply, and one for ground connection. Instead of using two ignition-signal pick-ups, one may use a single pickup at the ignition coil in conjunction with the gating circuit 70 in FIG. 1. Briefly, the gating circuit turns on the spark line from the test terminal 26 in that fraction of the cycle where one or the other of the two desired cylinders is firing, and signals from the other cylinders do not trigger (i.e: "reset") the primary flip-flop 11.

Referring again to FIG. 1, the auxiliary flip-flop 61 uses a crankshaft pulley-derived pulse 35 from the reference input terminal 25 over an input terminal 65 to set it. Once set, the gating circuit 70 generates a gate pulse 69 which resets it to flop over between two ignition pulses, just prior to occurrence of the ignition pulse desired to be supervised. To locate the firing of the first and fifth cylinders in the gate the time delay between set and reset is established at 155°. Referring to FIG. 5, it will be seen that this locates the gate at the beginning of the meter range, which is in the 90° interval from 70° advance to 20° retard. When the auxiliary flip-flop 61 is in the "set" condition, its first output terminal 67 is at logic LO, effectively grounding the cathode of the diode 71 that is connected via a coupling capacitor 72 to the test input terminal. Any positive-going ignition-derived pulse 36 arriving while the auxiliary flip-flop is in the "set" condition will therefore be shorted to the gate terminal 67 via the diode 71. Simultaneously, the second output 68 is at logic HI. When the auxiliary flip-flop is in the reset condition, its first output 67 is HI and its second output 68 is LO; the diode 71 is biased off, and a positive-going ignition-derived pulse 36 arriving then will be applied to the second or test input 16 of the primary flip-flop 11.

Starting at the moment when the auxiliary flip-flop 61 is set, its first output 67 is at logic LO, and its second output 68 is at logic HI. An integrating circuit comprised of a resistor R73 and a capacitor C74 (for example R = 10kΩ and C = 100μfd at 6 volts) has a sufficiently long time constant to present an effectively DC voltage to a first input terminal 75 of an operational amplifier 77. This DC voltage is compared with a reference DC voltage derived from the tap 79 of a potentiometer 78 (for example 5kΩ) connected across the voltage supply (to be described) and applied to a second input terminal 76 of the operational amplifier. The output of the operational amplifier at terminal 80 drives a transistor Q81 which when conductive shunts charging current from a timing capacitor 85. The charging rate of the capacitor C85 is determined by the difference between these two DC voltages applied to the respective inputs 75 and 76 of the operational amplifier 77.

The timing capacitor is held discharged, and cannot begin to charge, while the first output terminal 67 of the auxiliary flip-flop 61 is at logic HI (reset condition) because then a positive voltage is fed via a diode 82 to Q81 base, holding Q81 conducting and the capacitor C85 discharged. Therefore, the timing capacitor C85 begins to charge each time the auxiliary flip-flop 61 is set by a pulley-derived reference pulse 35. The timing capacitor will continue to charge, until the operational amplifier 90 following it, acting as a voltage comparator, has equal input voltages at its input terminals 91 and 92. One input voltage, at the first terminal 91 is fixed, and derived from the power supply, and the second input voltage at the second input terminal 92 is the ramp voltage produced by the charging capacitor C85. The output 93 of the second operational amplifier 90 is ordinarily a low voltage. At the moment the ramp voltage crosses the fixed voltage the amplifier output at 93 swings high, which resets flip-flop 61 through line 94. The timing capacitor 85 now discharges via Q81, which makes the amplifier output at 93 return to low.

The rate of charge of the timing capacitor C85 is determined by the setting of the tap 79 on the potentiometer 78 and the DC level of the integrating capacitor 74. However, it should be realized that at high engine RPM the charging rate will be faster than at low engine RPM. When the gating pulse occurs at 155° over a number of revolutions, the voltage level of the integrating capacitor 74 becomes essentially equal to the reference voltage at tap 79. Any deviation from 155° produces an error signal into amplifier 77, that then changes conduction of Q81. At low RPM Q81 is more conductive and charging time of C85 is therefore longer.

As is mentioned above, in the example herein described, the charging time is arbitrarily set for a time delay of 155° following a reference signal pulse that sets the auxiliary flip-flop 61. Following that time delay a reset pulse 69 is generated in the system and the auxiliary flip-flop 61 is reset, so that a test pulse 36 derived alternately from the ignition pulse for first or fifth cylinders is passed to the primary flip-flop 11. The next-succeeding reference pulse 35 then sets the auxiliary flip-flop 61, to start the cycle over again.

FIG. 3 illustrates an arrangement for deriving pulses 36 from the primary ignition circuit of an engine under test with a single pickup. The battery 100 of the engine customarily supplies the coil 101 via a ballast resistor RB102. Described simply, the circuit to ground is completed through distributor contacts 103. A tap 104 between ground and the junction 105 of the ballast resistor and the coil 101 is the primary pickup for the ignition derived pulses 36. As the graph 106 adjacent the tap 104 represents, there is present across this tap a voltage wave which changes between battery voltage (nominally 14.7 volts with automotive batteries currently in use) for open-circuit (0) and some lower voltage (nominally 8.0 volts) representing IR drop in the resistor for closed-circuit (C), each time an ignition pulse is sent to a cylinder. The tap 104 is coupled, through C72 via the test signal terminal 26 (FIG. 1) over a single signal conductor. This arrangement reduces to four the number of conductors required to couple the system to an engine being tested. A further reduction to three conductors can be realized with an engine-derived power supply as is illustrated in FIG. 4.

It will be understood that the system shown in FIG. 1, in particular the gating subassembly 70, presumes that a power supply providing steady reference voltages is available. An instrument embodying the invention can have its own power supply. FIG. 1 shows an arrangement in which the power supply derives its energy from the engine battery, over the same line that brings ignition-derived signals to the test signal terminal 26. FIG. 4 shows suitable contents for the block 110 labelled POWER SUPPLY in FIG. 1.

In FIG. 4, a capacitor C112 (for example 500 $\mu$fd at 25 volts) is charged through a diode D113 by pulses from the tap 104 in FIG. 3. A first zener diode D114 across the input of the supply is a protective diode, set at about 18 volts. The charge on the capacitor leaks off between ignition-derived pulses through a resistor R116, the emitter-collector path of a transistor Q115 and a second zener diode D117, in series. Two diodes D118 and D119 are connected in series across the path comprised of the resistor R116 and Q115 emitter-base path, and their junction with Q115 base is connected to ground over a second resistor R121. The two diodes D118 and D119 in series have a fixed voltage drop from their junction 122 with the leakage resistor R116, and so hold the drop in the leakage resistor from varying. Thus, the transistor Q115 with the leakage resistor R116 becomes a constant-current source for the second zener diode D117, which becomes the output voltage source for the entire instrument. A substantially constant voltage at (+)5 volts to ground, is made available at the power supply output terminal 111. The capacitor C123 across the output zener diode D117 is an RF by-pass capacitor. Suitable components for the power supply are:

D113 ... 1N4004
D114 ... 1N968
D117 ... 1N751
D118 ... 1N3064
D119 ... 1N3064
R116 ... 13 ohms
R121 ... 660 Ω
C112 ... 500 $\mu$fd at 25 volts
C123 ... 0.01 $\mu$fd
Q115 ... 2N3628

While the invention has been illustrated with embodiments employing a rectangular wave (38 in FIG. 2), the scope of the invention is not so limited. waves of other forms (e.g: triangular) may be used, as those skilled in the art will recognize.

I claim:

1. Method of measuring ignition timing of an internal combustion engine having a crankshaft and an even number of cylinders comprising steps of:
generating in each revolution of said crankshaft a reference signal which coincides in time with the same specified angular position of said crankshaft, whereby upon successive revolutions of said shaft to generate a train of said reference signals which are spaced apart in time proportional to the rotational velocity of said shaft, generating in alternate ones of said revolutions a first series of ignition signals each of which substantially coincides in time with an ignition pulse supplied to a first of a pair of said cylinders which fire 360° apart, generating in intervening ones of said revolutions a second series of ignition signals each of which substantially coincides in time with an ignition pulse supplied to the second of said cylinders, generating an electric wave train by shifting between a first predetermined voltage value and a second predetermined voltage value in response to, respectively, said reference signals and said ignition signals, and measuring the average DC level between said voltage values.

2. Method according to claim 1 comprising the steps of generating said first series of ignition signals from ignition pulse energy flowing to said first cylinder, and generating said second series of ignition signals from ignition pulse energy flowing to said second cylinder.

3. Method according to claim 1 comprising the steps of generating both said first series and said second series of ignition signals from a common source in the ignition system of said engine, and subsequently separating ignition signals of said first series from ignition signals of said second series.

4. Method according to claim 1 including the further steps of measuring the frequency of said rectangular wave train and indicating said frequency in terms of revolutions per minute of said engine.

5. Method according to claim 1 in which said wave train is rectangular.

6. Apparatus for measuring ignition timing of an internal combustion engine having a crankshaft and a plurality of cylinders, comprising set-reset electric wave output means having first and second input signal terminals for the application of, respectively, a set pulse signal and a reset pulse signal, and first and second output voltage terminals which during operation are each established at one or the other, respectively, of two different predetermined voltage values, such that the voltage values at said output terminals can be either in a first state or in a second state reversed relative one to the other, first input means coupled to said first input signal terminal for applying thereto a reference pulse coinciding in time with a specified angular position of said crankshaft, second input means coupled to said second input signal terminal for applying thereto test pulses coinciding in time alternately with the ignition pulses supplied, respectively, to two selected cylinders which fire 360° apart, whereby during operation of said engine to apply to said apparatus a train of said reference pulses interleaved one-by-one with a train of said test pulses corresponding alternately to one and then the other of said cylinders, thereby to cause said predetermined voltage values to alternate between said first state and said second state in synchronism with said pulses such that with respect to time the voltage between said output voltage terminals becomes an electric wave train alternating between said predetermined voltage values, and means coupled effectively across said output voltage terminals to measure the DC level between said voltage values of said wave train over several cycles thereof.

7. Apparatus according to claim 6 in which said means coupled to said second input signal terminal comprises a separate coupling to the ignition line of each of said two selected cylinders.

8. Apparatus according to claim 6 for measuring ignition timing of an internal combustion engine having an ignition coil, a crankshaft and a plurality of cylinders in which said means coupled to said second input signal terminal comprises a connection from the battery side of said ignition coil of said engine to said second input signal terminal, for deriving from the battery connection to said coil a test pulse coinciding in time with the ignition pulse applied to each cylinder of said engine, switch means for controlling passage of said test pulses to said second input signal terminal, gate means controlling said switch means to pass said test pulses coinciding with the ignition pulses of said two cylinders, and means to synchronize said gate means with said reference pulses.

9. Apparatus according to claim 8 including voltage generating means comprising a storage capacitor connected in series with a diode from the battery side of said coil to the remaining side of the battery, means providing a substantially constant-current discharge path across said capacitor, and means in said path to provide a source of substantially constant voltage.

10. Apparatus for measuring ignition timing of an internal combustion engine having a crankshaft and a plurality of cylinders, comprising set-reset electric wave output means having first and second input signal terminals for the application of, respectively, a set pulse signal and a reset pulse signal, and first and second output voltage terminals which during operation are each established at one or the other, respectively, of two different predetermined voltage values, such that the voltage values at said output terminals can be either in a first state or in a second state reversed relative one to the other, first input means coupled to said first input signal terminal for applying thereto a reference pulse coinciding in time with a specified angular position of said crankshaft, second input means coupled to said second input signal terminal for applying thereto a test pulse coinciding in time with the ignition pulse supplied to a selected one of said cylinders, whereby during operation of said engine to apply to said apparatus a train of said reference pulses interleaved with a train of said test pulses, thereby to cause said predetermined voltage values to alternate between said first state and said second state in synchronism with said pulses such that with respect to time the voltage between said output voltage terminals becomes an electric wave train alternating between said predetermined voltage values, and means coupled effectively across said output voltage terminals to measure the DC level between said voltage values of said wave train over several cycles thereof, said apparatus including calibrating circuit means having an input connection to said first input means and first and second paths in shunt from said input connection to respective first and second calibrating terminals, first switch means arranged to transfer said first input signal terminal from said first input means to said first calibrating terminal, second switch means arranged to transfer said second input signal terminal from said second input means to said second calibrating terminal, said calibrating circuit means being arranged to apply said reference pulses alternately to said first and second input signal terminals whereby to cause said predetermined voltage values to alternate between said first state and said second state in synchronism with only said reference pulses and thereby provide a prescribed value of said DC level.

11. Apparatus for measuring ignition timing of an internal combustion engine having a crankshaft and a plurality of cylinders, a primary source of electric energy and distributor means arranged to supply ignition energy from said source to each of said cylinders, said apparatus comprising set-reset electric wave output means having first and second input signal terminals for the application of, respectively, a set pulse signal and a reset pulse signal, and first and second output voltage terminals which during operation are each established at one or the other, respectively, of two different predetermined voltage values, such that the voltage values at said output terminals can be either in a first state or in a second state reversed relative one to the other, first input means coupled to said first input signal terminal for applying thereto a reference pulse coinciding in time with a specified angular position of said crankshaft, second input means coupled to said second input signal terminal for applying thereto a test pulse coinciding in time with the ignition pulse supplied to a selected one of said cylinders, whereby during operation of said engine to apply to said apparatus a train of said reference pulses interleaved with a train of said test pulses, thereby to cause said predetermined voltage values to alternate between said first state and said second state in synchronism with said pulses such that with respect to time the voltage between said output voltage terminals becomes an electric wave train alternating between said predetermined voltage values, means coupled effectively across said output voltage terminals to measure the DC level between said voltage values of said wave train over several cycles thereof, and voltage generating means for supplying power to said apparatus, comprising a diode, a storage capacitor connected in series with said diode to said distributor for storing bursts of electric energy in said capacitor in synchronism with firing of said cylinders, means providing a substantially constant-current discharge path across said capacitor, and means in said path to provide a source of substantially constant voltage for said apparatus.

* * * * *